US011660736B1

(12) United States Patent
Wang

(10) Patent No.: US 11,660,736 B1
(45) Date of Patent: May 30, 2023

(54) STAPLER

(71) Applicant: APEX MFG. CO., LTD., Taichung (TW)

(72) Inventor: Jing-Li Wang, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 0 days.

(21) Appl. No.: 17/667,983

(22) Filed: Feb. 9, 2022

(51) Int. Cl.

| | |
|---|---|
| ***B25B 21/02*** | (2006.01) |
| ***B23B 45/00*** | (2006.01) |
| ***B25B 19/00*** | (2006.01) |
| ***B25C 5/16*** | (2006.01) |
| ***B25C 5/11*** | (2006.01) |
| ***B25C 5/04*** | (2006.01) |
| ***B25C 5/02*** | (2006.01) |

(52) U.S. Cl.
CPC .......... *B25C 5/1658* (2013.01); *B25C 5/0257* (2013.01); *B25C 5/045* (2013.01); *B25C 5/11* (2013.01)

(58) Field of Classification Search
None
See application file for complete search history.

(56) References Cited

U.S. PATENT DOCUMENTS 3,510,043 A * 5/1970 Charles .................. B25C 5/1658 227/113
5,497,931 A * 3/1996 Nakamura ............ B25C 5/1679 227/119
5,884,829 A * 3/1999 Wingert .................. B25C 5/085 227/151
2008/0156844 A1* 7/2008 Braganza .................. B25C 5/06 227/120

* cited by examiner

*Primary Examiner* — Hemant Desai
*Assistant Examiner* — Tanzim Imam
(74) *Attorney, Agent, or Firm* — Muncy, Geissler, Olds & Lowe, P.C.

(57) ABSTRACT

A stapler is provided, including: a main body, including a front end portion, the front end portion including a staple outlet and a plate member, the plate member including a concave adjacent to the staple outlet; a holder, switchably disposed on the main body, including a plurality of notches with different sizes and a plurality of first positioning portions; and a positioning member, disposed on the main body, releasably positioned with one of the plurality of first positioning portions so that one of the plurality of notches corresponds to the concave in a front to rear direction, for receiving a portion of a cable.

9 Claims, 11 Drawing Sheets

STAPLER

BACKGROUND OF THE INVENTION

Field of the Invention

The present invention relates to a stapler.

Description of the Prior Art

In many fields, there is often a need to arrange cables according to different environments or operational needs, wherein the cables may be electrical cables or non-electrical cables. Specifically, the requirement of arranging conductive cables in order to build a circuit is more common.

The cable is usually fixed on a mounting base (such as wood or cement base). Since the cable is very long and flexible, it is not easy to make it straight and positioned. Therefore, a stapler with staples (such as U-shaped staples) is commonly used to fix the cable. However, if the position of the cable is not stably maintained before the cable is fixed by the staples, the cable can be easily displaced, which is not conducive to operation of stapling, and the cable can be damaged by the staples easily.

U.S. Pat. No. 5,497,931 discloses a cable-holding structure suitable for cables of various sizes, wherein it is adapted to fix cables of different sizes through swinging an adjustment member provided on the main body of the stapler to select one of notches of different sizes. However, there is a need of a large space for the swinging of the adjustment member, resulting in a larger size of the stapler and an unstable and easily-damaged structure.

The present invention is, therefore, arisen to obviate or at least mitigate the above-mentioned disadvantages.

SUMMARY OF THE INVENTION

The main object of the present invention is to provide a stapler which can effectively hold a cable for stapling.

To achieve the above and other objects, a stapler is provided, including: a main body, including a front end portion, the front end portion including a staple outlet and a plate member, the plate member including a concave adjacent to the staple outlet; a holder, switchably disposed on the main body, including a plurality of notches with different sizes and a plurality of first positioning portions; and a positioning member, disposed on the main body, releasably positioned with one of the plurality of first positioning portions so that one of the plurality of notches corresponds to the concave in a front to rear direction, for receiving a portion of a cable.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
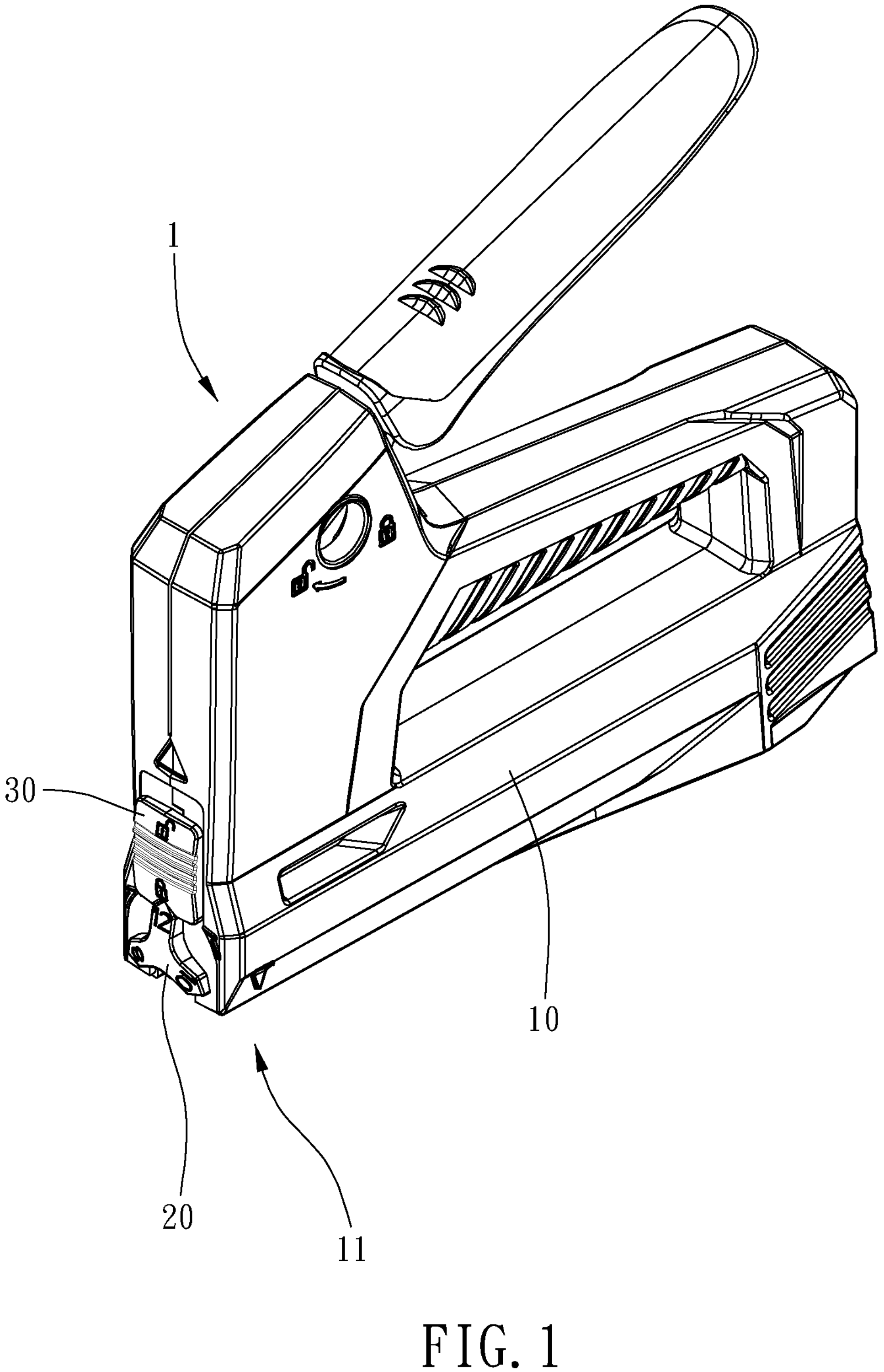
FIG. 1 is a stereogram of a preferable embodiment of the present invention.
Figure 2:
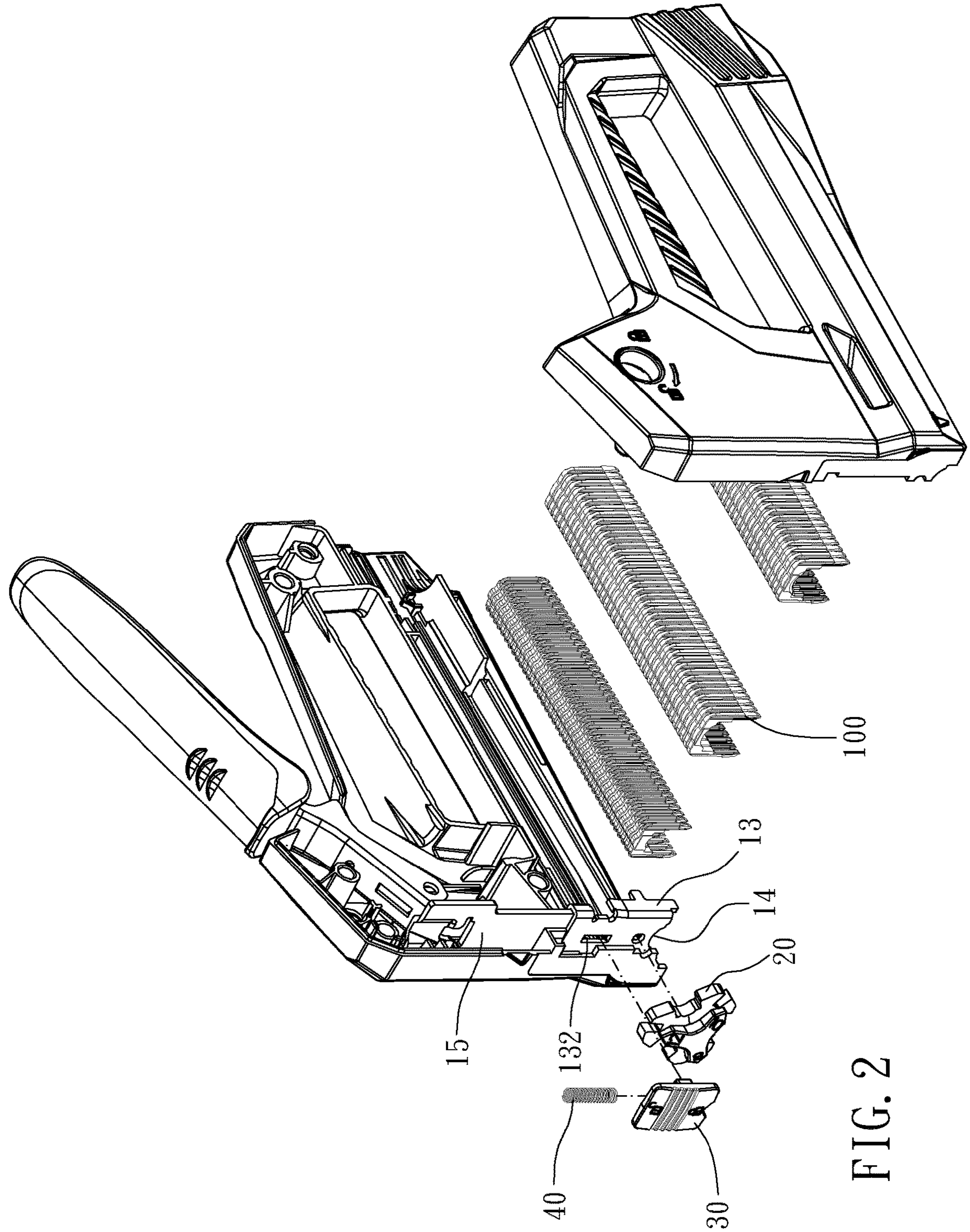
FIG. 2 is a breakdown drawing of a preferable embodiment of the present invention.
Figure 3:
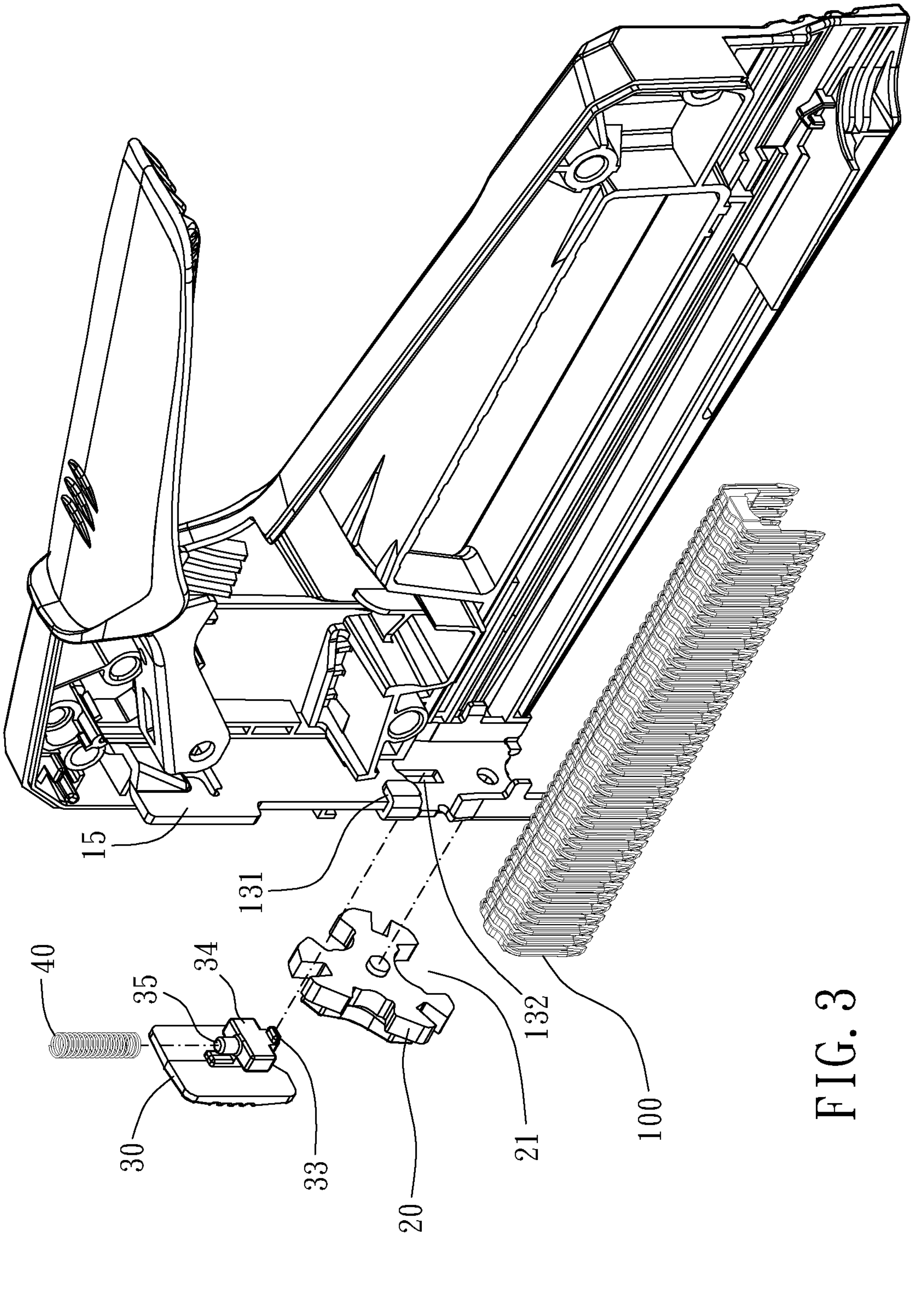
FIG. 3 is a partial breakdown drawing of a preferable embodiment of the present invention.

Please refer to FIGS. 1 to 11 for a preferable embodiment of the present invention. A stapler 1 of the present invention includes a main body 10, a holder 20 and a positioning member 30.

The main body 10 includes a front end portion 11, the front end portion 11 includes a staple outlet 12 and a plate member 13, and the plate member 13 includes a concave 14 adjacent to the staple outlet 12. The holder 20 is switchably disposed on the main body 10, and the holder 20 includes a plurality of notches 21 with different sizes and a plurality of first positioning portions 22. The positioning member 30 is disposed on the main body 10, and the positioning member 30 is releasably positioned with one of the plurality of first positioning portions 22 so that one of the plurality of notches 21 corresponds to the concave 14 in a front to rear direction, for receiving a portion of a cable. Whereby, after a required one of the plurality of notches 21 is chosen by switching the holder 20, the holder 20 is stably positioned so that the cable can be stably held for stapling.

The main body 10 further includes a striker 15 configured to strike a staple 100. The holder 20 is disposed on the front end portion 11, and the plate member 13 includes a guiding slot 131. The striker 15 is slidably received within the guiding slot 131, which stabilizes the strike to the staple 100. In this embodiment, the holder 20 is rotatably disposed on the front end portion 11, and each of the plurality of notches 21 corresponds to one of the plurality of first positioning portions 22 on a radial direction of the holder 20.

Figure 4:
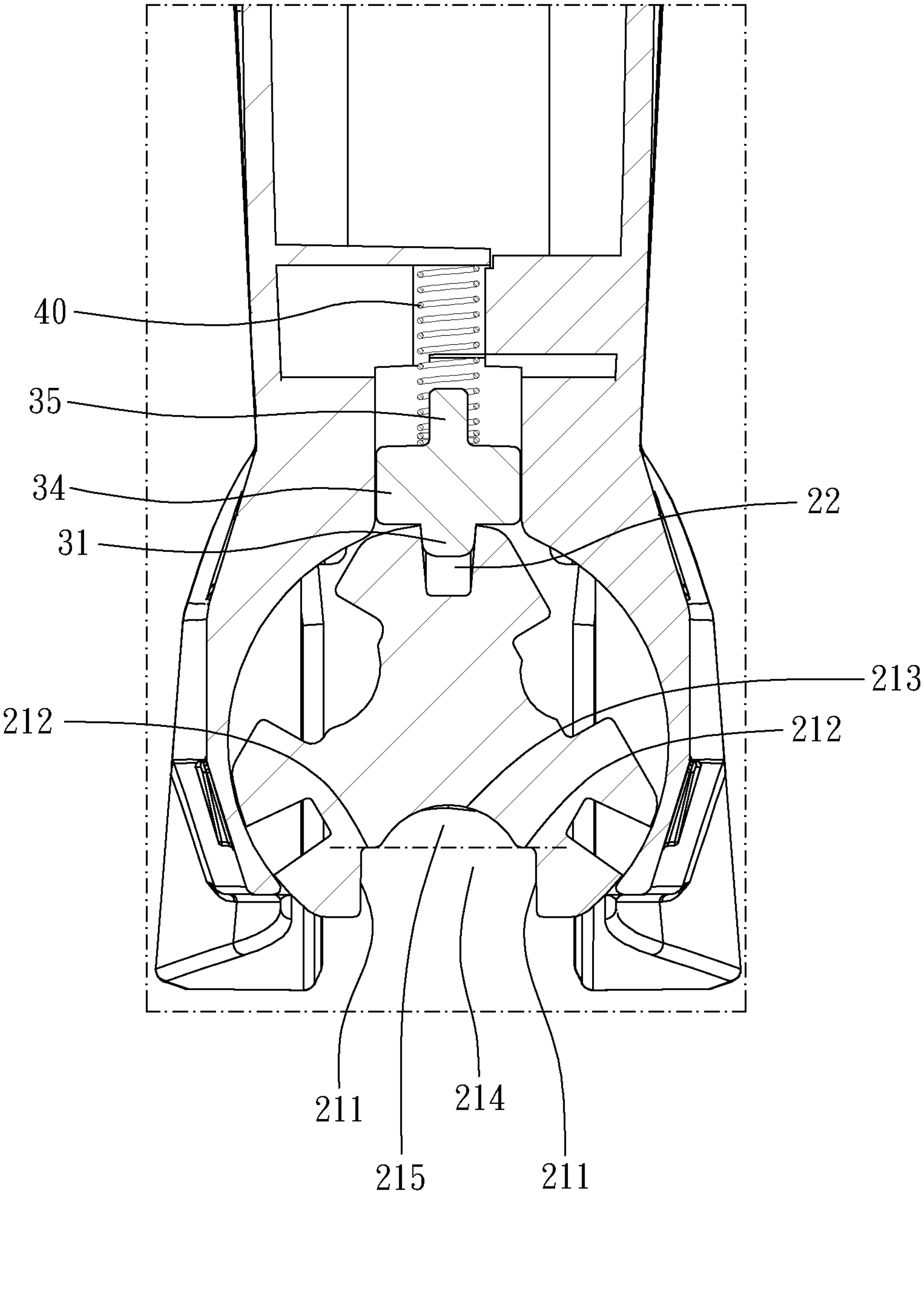
FIG. 4 is a partial cross-sectional view of a preferable embodiment of the present invention.
Figure 5:
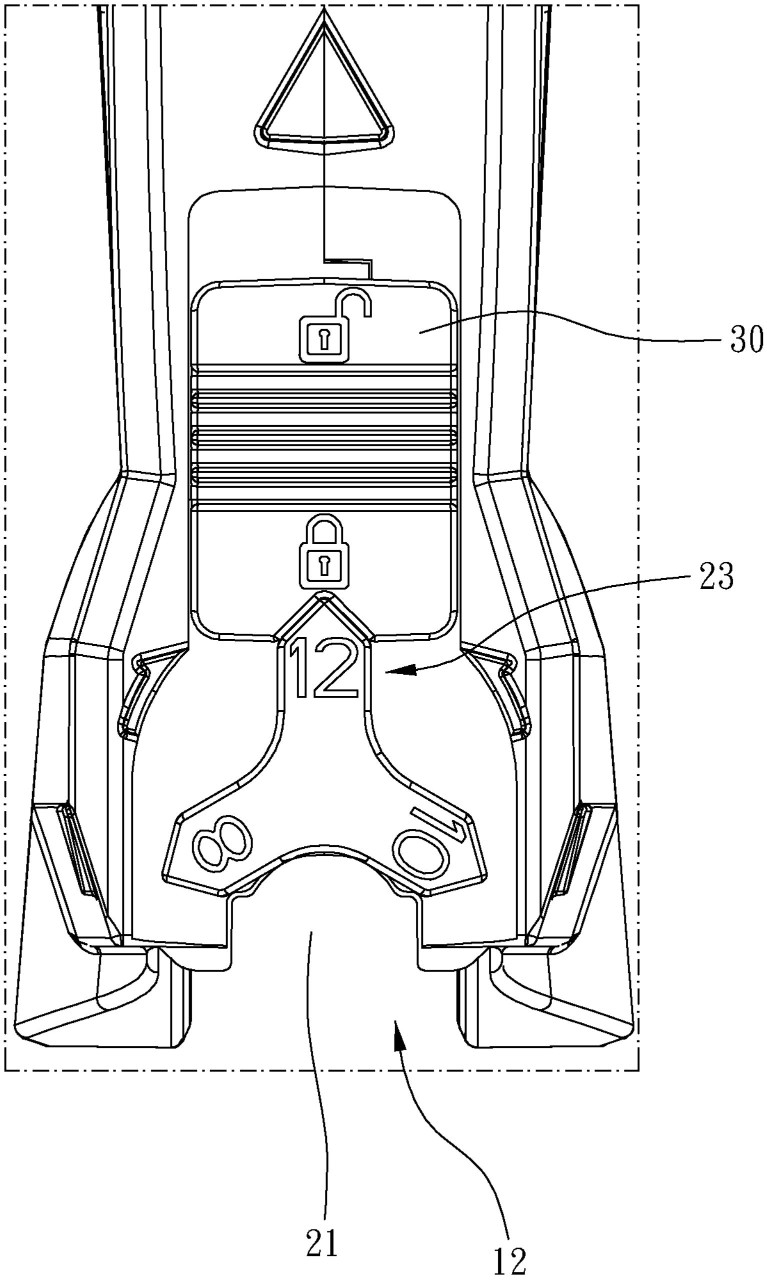
FIGS. 5-9 are drawings showing operation of a preferable embodiment of the present invention.
Figure 6:
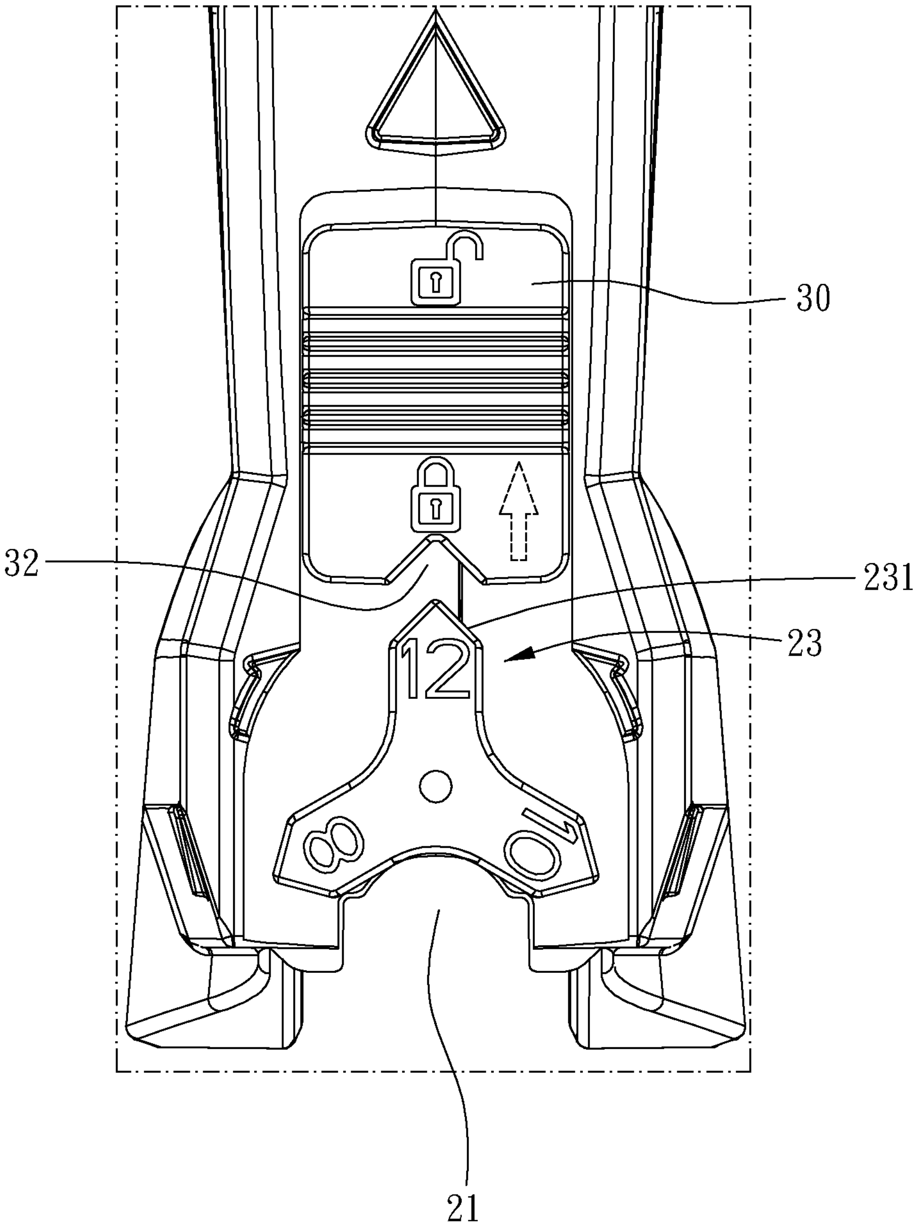
Figure 7:
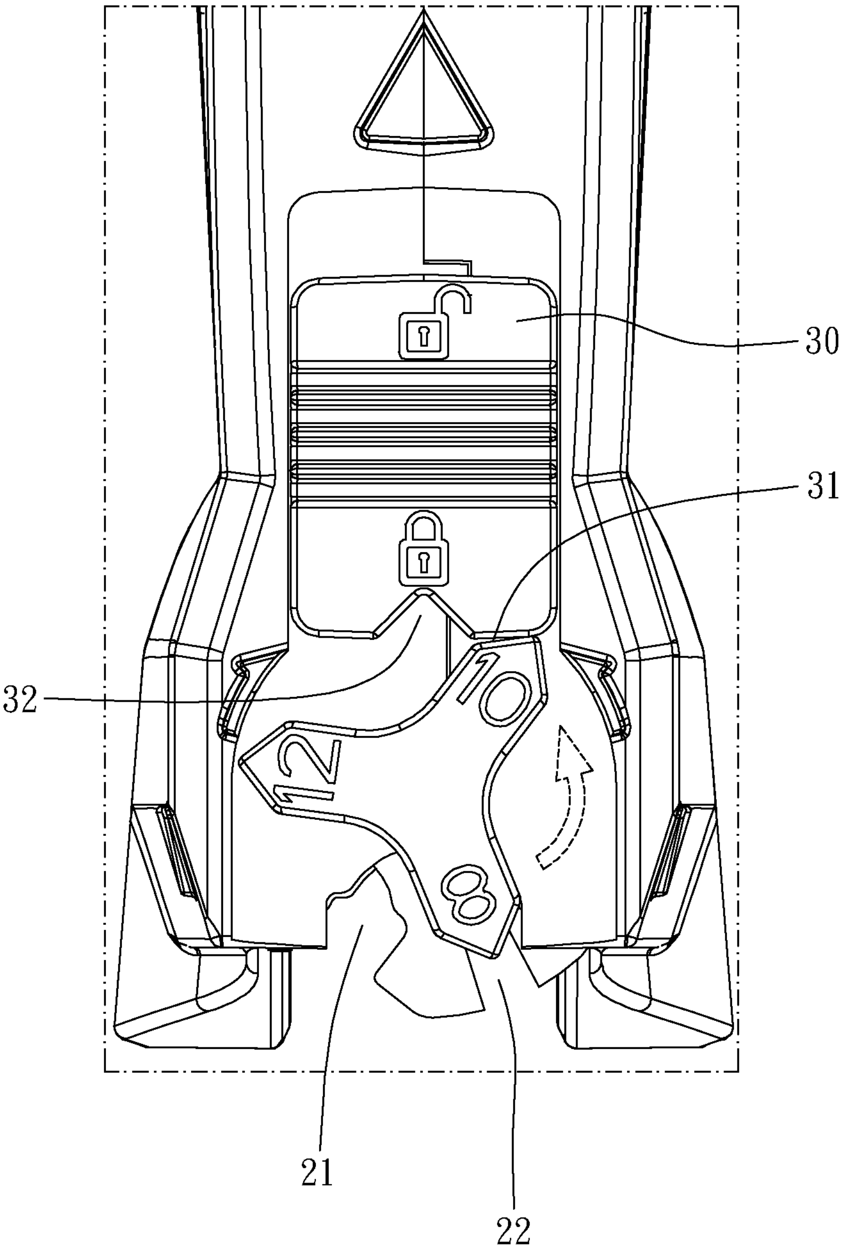
Figure 8:
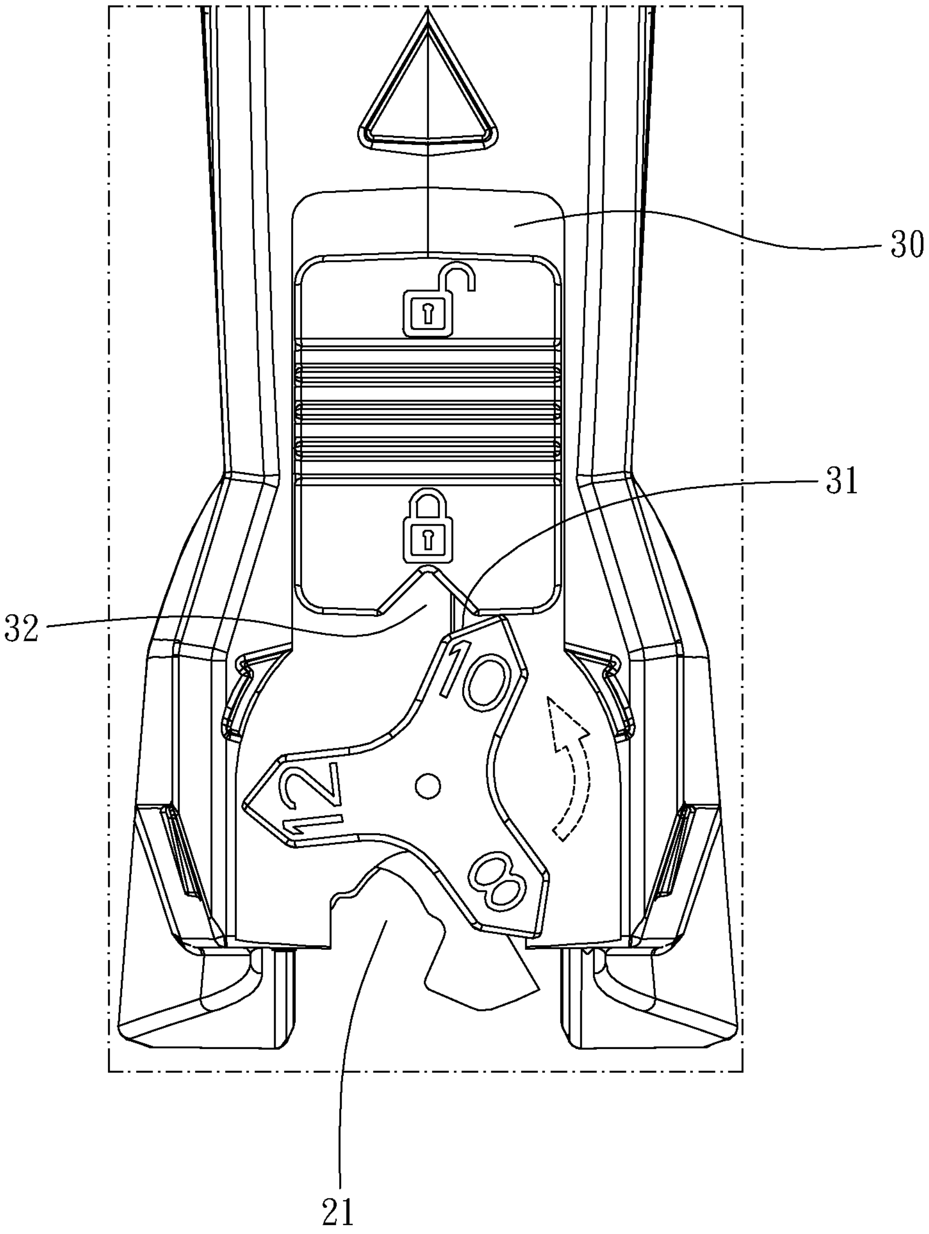
Figure 9:
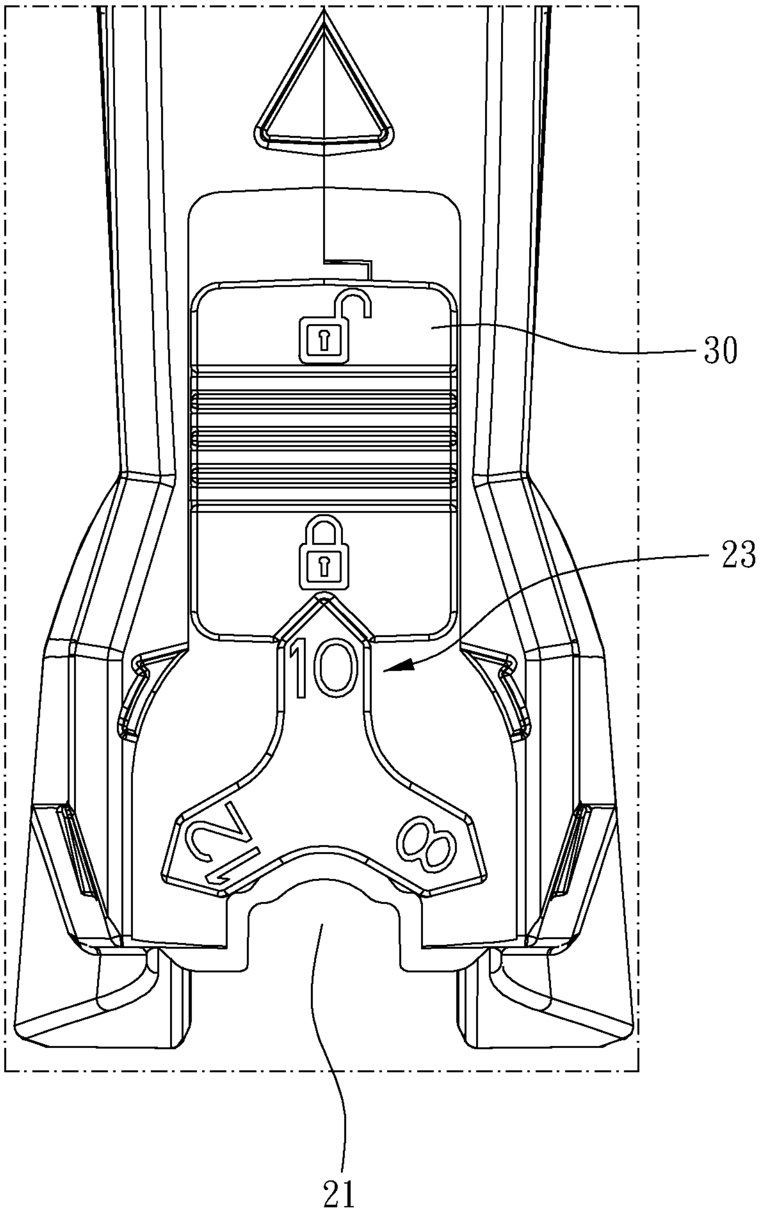
Figure 10:
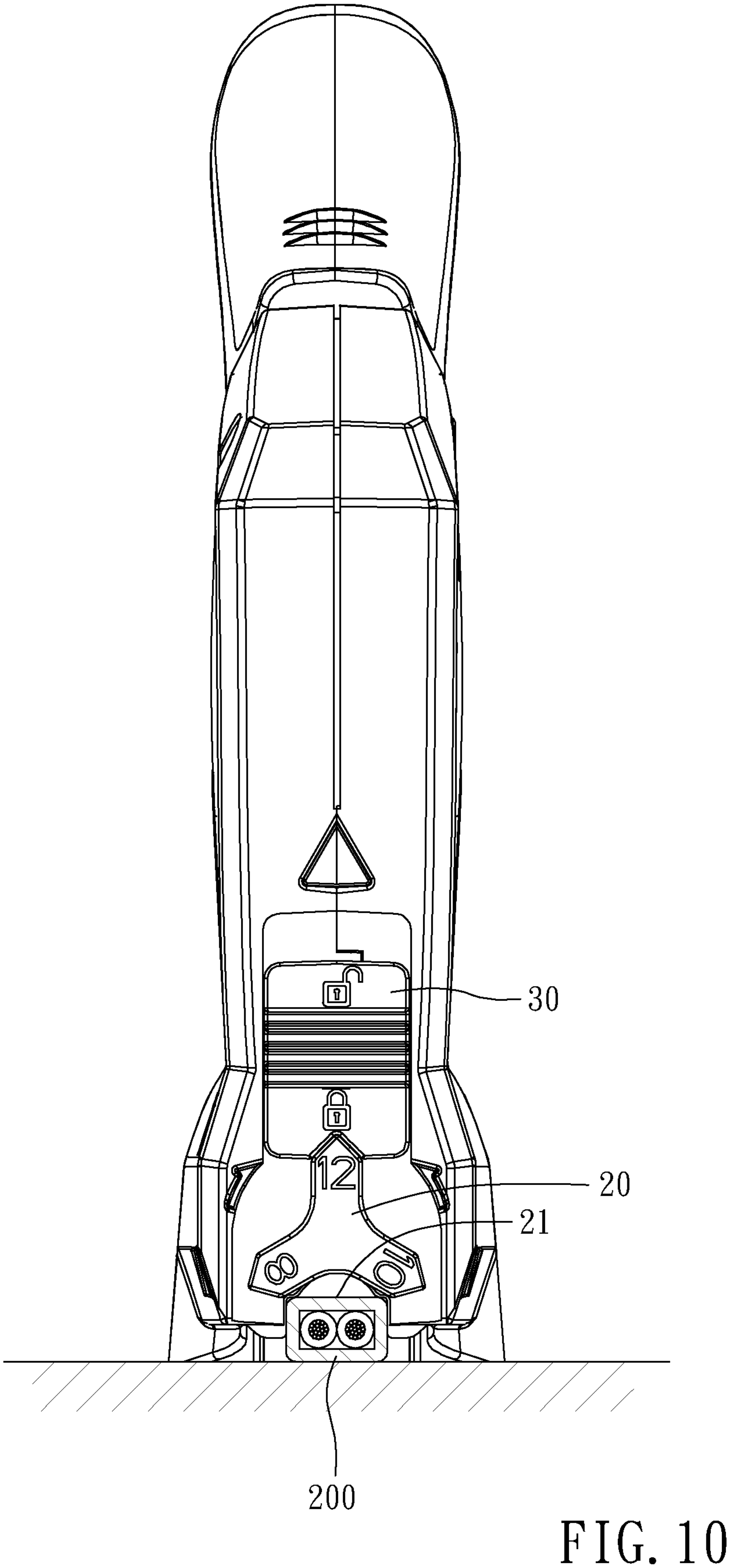
FIGS. 10 and 11 are drawings showing different applications according to a preferable embodiment of the present invention.
Figure 11:
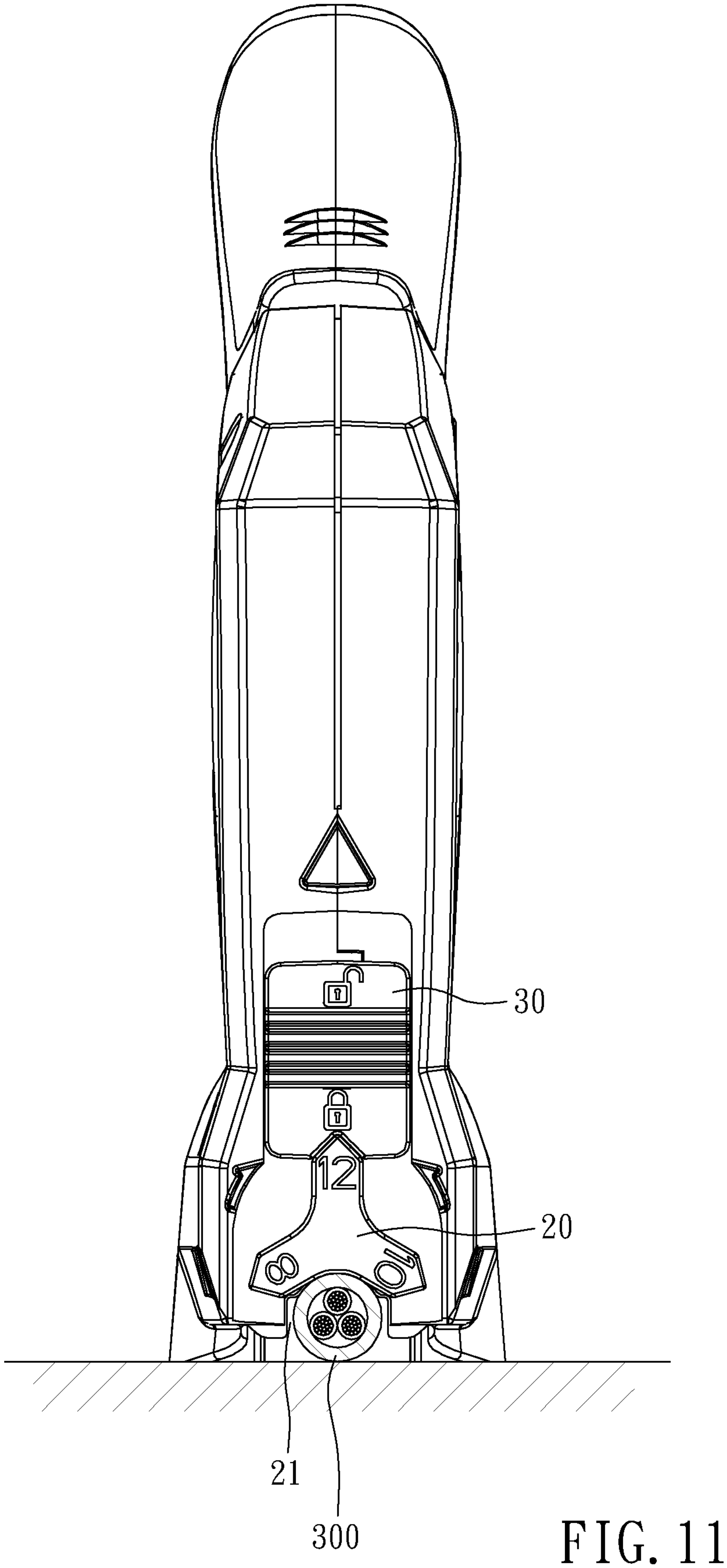

Specifically, each of the plurality of notches 21 includes two straight sides 211 opposite to each other, two shoulders 212 and a concave portion 213. The two shoulders 212 are laterally connected to the two straight sides 211, respectively. The concave portion 213 is connected to an end of each of the two shoulders 212. An extension of the two shoulders 212 divides the notch 21 into a rectangular region 214 and a segment region 215 (FIG. 4). The rectangular region 214 is configured to be applied to a cable 200 which is rectangular or flat (FIG. 10), and the segment region 215 is configured to be applied to a cable 300 which is circular (FIG. 11).

The positioning member 30 includes at least one second positioning portion 31, one of the first positioning portion 22 and the second positioning portion 31 includes a recess, and the other of the first positioning portion 22 and the second positioning portion 31 includes a protrusion releasably positioned within the recess releasably. In this embodiment, the first positioning portion 22 includes the recess, and the second positioning portion 31 includes the protrusion. The recess and the protrusion are simple in structure and stably positionable with each other.

The holder 20 further includes a plurality of size indicative portions 23, and each of the plurality of size indicative portions 23 corresponds to one of the plurality of notches 21 radially, for indicating the size of the notch 21 which is selected. The positioning member 30 further includes a positioning slot 32, and each of the plurality of size indicative portions 23 is releasably engaged within the positioning slot 32. Through rotating the holder 20 to make one of the plurality of size indicative portions 23 engaged within the positioning slot 32, the notch 21 which is required can be selected quickly.

The positioning member 30 is movably disposed on the front end portion 11. Specifically, the plate member 13 further includes a groove 132, the positioning member 30 further includes a projection 33, a base 34 and a shaft 35, and the projection 33 and the shaft 35 extend from the base 34 and are lateral to each other. The projection 33 is slidably received within the groove 132 so that the projection 33 can operate smoothly, stably and precisely.

The stapler 1 further includes an elastic member 40, and the elastic member 40 is disposed between the front end portion 11 and the positioning member 30. Specifically, the elastic member 40 is a coil spring and disposed around the shaft 35, and the at least one second positioning portion 31, the shaft 35 and the coil spring are arranged in line so that the elastic member 40 can stably and effectively urge the positioning member 30 to provide good positioning and recovering effects. Preferably, an end of each of the plurality of size indicative portions 23 is outwardly tapered and includes two bevels 231, and each of the two bevels 231 urges the positioning member 30 and moves into the positioning slot 32 when the holder 20 is switched. Specifically, when the positioning member 30 is moved or the holder 20 is rotated, the bevel 231 of one of the plurality of size indicative portions 23 urges the positioning member 30 to move so that the second positioning portion 31 disengages from the positioning slot 32; when the holder 20 is kept rotating, the bevel 231 of another one of the plurality of size indicative portions 23 urges the positioning member 30 to move so that the another one of the plurality of size indicative portions 23 engages into the positioning slot 32 automatically (FIGS. 5-9), thus being easy and quick to operate.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A stapler, including:

a main body, including a front end portion, the front end portion including a staple outlet and a plate member, the plate member including a concave adjacent to the staple outlet;

a holder, switchably disposed on the main body, including a plurality of notches with different sizes and a plurality of first positioning portions; and a positioning member, disposed on the main body, releasably positioned with one of the plurality of first positioning portions so that one of the plurality of notches corresponds to the concave in a front to rear direction, for receiving a portion of a cable;

wherein the holder further includes a plurality of size indicative portions, each of the plurality of size indicative portions corresponds to one of the plurality of notches, the positioning member includes a positioning slot, and each of the plurality of size indicative portions is releasably engaged within the positioning slot.

2. The stapler of claim 1, wherein the main body further includes a striker configured to strike a staple, the plate member includes a guiding slot, the striker is slidably received within the guiding slot, and the holder is disposed on the front end portion.

3. The stapler of claim 2, wherein the positioning member is movably disposed on the front end portion.

4. The stapler of claim 3, wherein the plate member further includes a groove, and the positioning member includes a projection slidably received within the groove.

5. The stapler of claim 3, further including an elastic member, wherein the elastic member is disposed between the front end portion and the positioning member.

6. The stapler of claim 1, wherein the positioning member includes at least one second positioning portion, one of the first positioning portions and the at least one second positioning portion includes a recess, and the other of the first positioning portions and the at least one second positioning portion includes a protrusion releasably positioned within the recess.

7. The stapler of claim 1, wherein an end of each of the plurality of size indicative portions is outwardly tapered and includes two bevels, and each of the two bevels urges the positioning member and moves into the positioning slot when the holder is switched.

8. The stapler of claim 7, wherein the main body further includes a striker configured to strike a staple, the plate member includes a guiding slot, the striker is slidably received within the guiding slot, the holder is disposed on the front end portion, the positioning member is movably disposed on the front end portion, the plate member further includes a groove, the positioning member includes a projection slidably received within the groove, a base, and a shaft, the projection and the shaft extend from the base and are lateral to each other, the stapler further includes an elastic member, the elastic member is a coil spring and disposed around the shaft, and the elastic member is disposed between the front end portion and the positioning member, the positioning member includes at least one second positioning portion, the at least one second positioning portion, the shaft, and the coil spring are arranged in line, one of the first positioning portions and the at least one second positioning portion includes a recess, and the other of the first positioning portions and the at least one second positioning portion includes a protrusion releasably positioned within the recess, each of the plurality of notches includes two straight sides opposite to each other, two shoulders, and a concave portion, the two shoulders are laterally connected to the two straight sides, respectively, the concave portion is connected to an end of each of the two shoulders, and an extension of the two shoulders divides the respective notch into a rectangular region and a segment region.

9. The stapler of claim 1, wherein the holder is rotatably disposed on the front end portion, and each of the plurality of notches corresponds to one of the plurality of first positioning portions on a radial direction of the holder.

* * * * *